Dec. 15, 1931.    R. E. MANLEY ET AL    1,836,540
SCREW OPERATED TIRE CHANGER
Filed Jan. 10, 1930    3 Sheets-Sheet 3
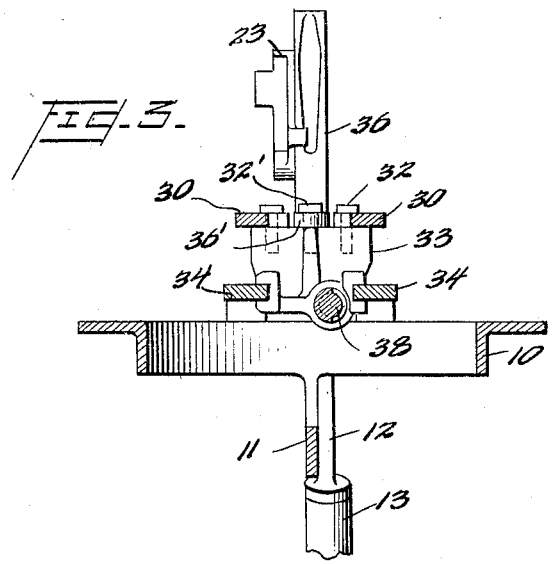
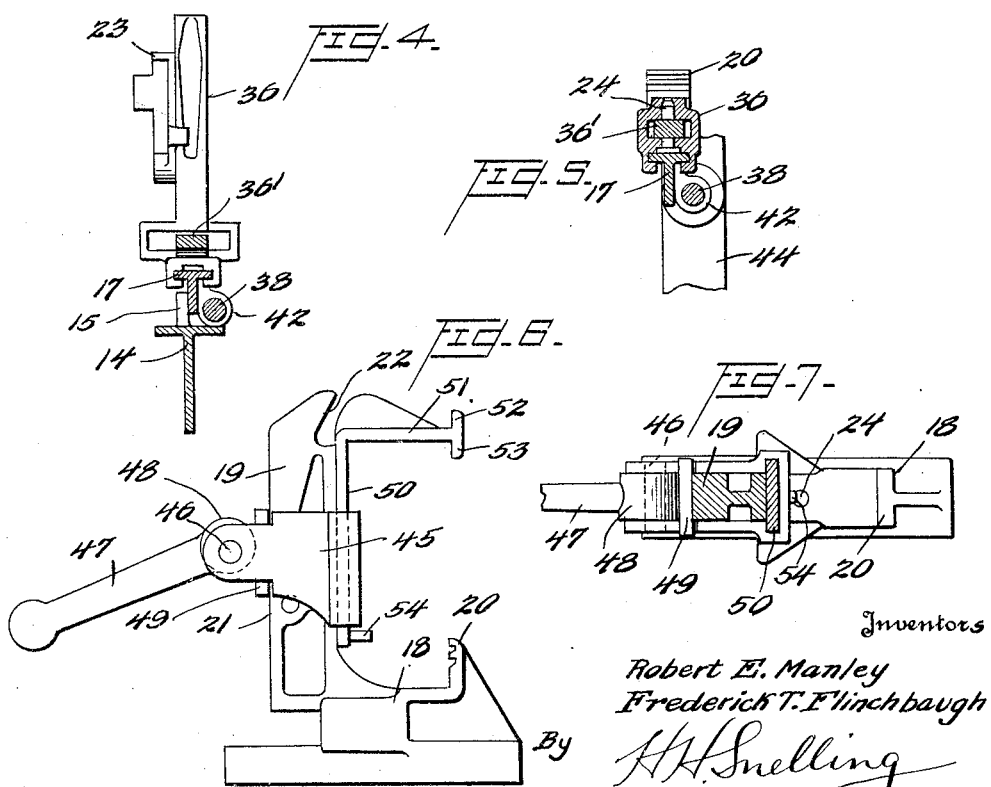
Inventors
Robert E. Manley
Frederick T. Flinchbaugh
By H. H. Snelling
Attorney Patented Dec. 15, 1931

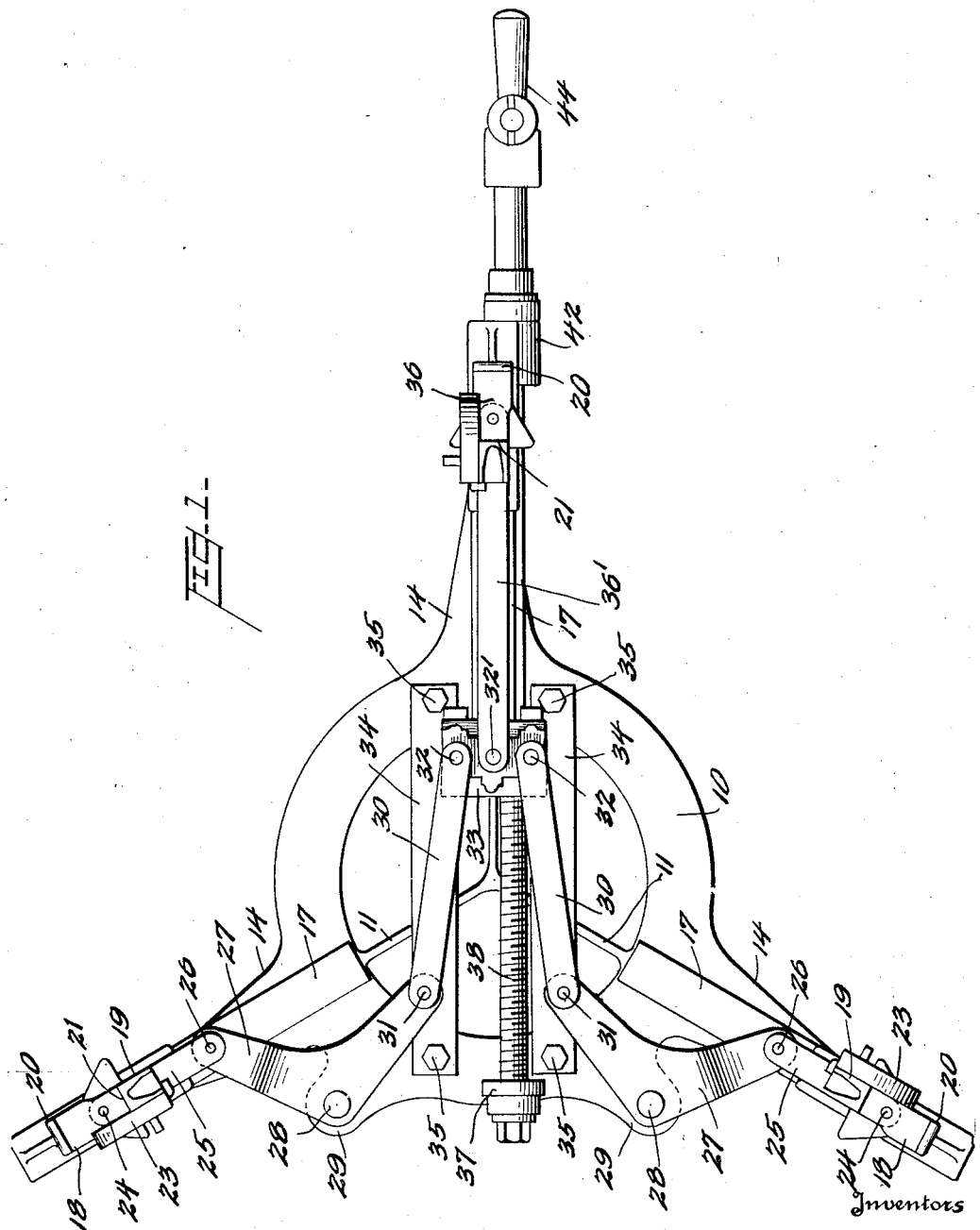

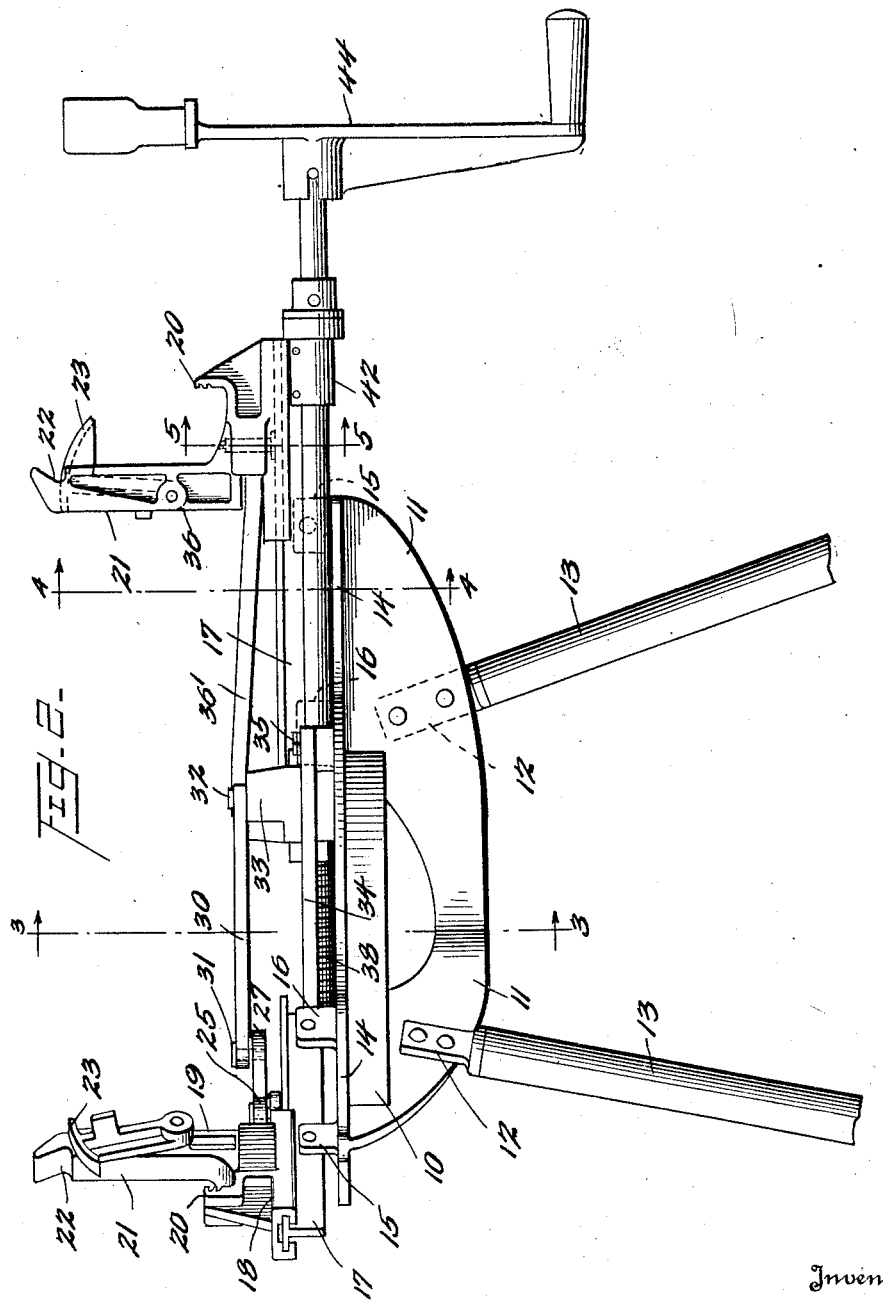

1,836,540

UNITED STATES PATENT OFFICE

ROBERT E. MANLEY AND FREDERICK T. FLINCHBAUGH, OF YORK, PENNSYLVANIA, ASSIGNORS TO THE MANLEY MANUFACTURING COMPANY, OF YORK, PENNSYLVANIA, A CORPORATION OF DELAWARE

SCREW OPERATED TIRE CHANGER

Application filed January 10, 1930. Serial No. 419,993.

This invention relates to tire changing mechanism and has for its object the provision of mechanism in which the radially movable jaws are actuated by movement of a pair of pivoted bell cranks which may be moved inwardly and outwardly by a nut traveling on an operating screw secured to the frame.

An object of the invention is to provide a mechanism for moving two of the rim engaging jaws thru the action of a pair of bell cranks having link connections to the jaws and to a traveling nut movable on an operating screw while another jaw is pivotally connected to the nut so as to move in unison with the other jaws as the nut travels transversely across the frame.

A further object of this invention is to provide parallel guide bars on the frame for reinforcing the frame and for guiding the nut as it travels transversely across the frame when the operating screw is rotated.

A still further object of this invention is to provide an auxiliary rim engaging member for use on one of the movable jaws which member includes a body member and a gripping member slidable to engage the tire rim and means on the body member for locking it on the jaw.

In the drawings:—

Figure 1 is a top plan view of the tire changer.

Figure 2 is a side elevation of the same.

Figure 3 is a section on lines 3—3 of Figure 2.

Figure 4 is a section on lines 4—4 of Figure 2.

Figure 5 is a section on lines 5—5 of Figure 2.

Figure 6 is a side elevation of one of the jaws and the body member and locking means.

Figure 7 is a transverse section thru the jaw and body member and locking means.

Referring more particularly to the drawings, 10 represents the annular frame of the tire changer which is provided with supporting ribs 11 to which are bolted the studs 12 for receiving the legs 13. The annular frame 10 is provided with radially extending projections 14 and on such extensions there are provided upstanding lugs 15 and 16 for securing upon the face of the frame the rolled steel T-bars 17. The lugs and T-bars are provided with openings thru which bolts are adapted to pass so as to securely retain the bars on the frame.

Slidably mounted on the T-bars are the rim engaging jaws 18 and 19. The jaws are formed with abutments 20 at their outer ends which are designed to engage the edges of split rims. The back of the jaw, designated at 21, is intended to press against the flat portion of the rim in the act of expanding a rim. At the upper end of the jaw back there is a notch 22, designed to receive the beaded edge of a solid rim, and pivoted to the back is a supporting plate 23 adapted to be swung to a position under the notch 22 to form a temporary support and guide for such solid rims.

Pivotally connected at 24 to two of the jaws 19 are links 25 having pivotal connections as at 26 to bell cranks 27. The bell cranks are pivotally mounted at 28 on bosses 29 formed on the frame 10. Links 30 are pivoted at 31 to the bell cranks and at 32 to a traveling nut 33. The sides of the nut are grooved so as to receive the edges of the guide bars 34, which are securely fastened by suitable bolts 35 to the frame 10 and are disposed in parallel relation so as to allow the nut 33 to be properly guided in its movement across the frame 10 and to prevent turning of the nut. Pivotally secured at 32' to the nut 33, between the pivots 32, is a link 36' to the other end of which is pivotally secured the rim engaging jaw 36 sliding on one of the T-bars 17.

Mounted upon the frame 10 is a thrust bearing 37 thru which the free end of operating screw 38 extends. The operating screw is square threaded over a greater part of its length and its remaining smooth portion passes thru a thrust bearing 42 which is secured to the T-bar. Secured to the end of the operating screw 38 is a handle 44 whereby the same may be rotated to regulate the inward or outward movement of the three jaws 19 and 36.

When it is desired to remove a tire from a split rim the U-shaped body member 45 is slid over the jaw nearest the break in the rim as shown in Figure 6 thus forming a double jaw at the rim split. The member 45 has pivotally connected to its free ends or ears as indicated at 46, a handle or lever 47 provided near its pivot end with an eccentric or cam 48 adapted to engage a block 49 for securely locking the rim holder 50 in chosen position on the rim engaging jaw. The end of the rim holder is offset at right angles to form a bracket 51 on which are rim engaging portions 52 and 53 for different widths of the rims. The other end of the rim holder, that is, the slide, is provided with a hole to receive the pin 54 which extends forwardly of the holder 50 a sufficient distance so as to be capable of engaging the lower edge of the body 45 to prevent the rim holder 50 from sliding out of the body member 45.

In operation of the tire changer, the handle 44 is rotated to impart a rotary motion to the operating screw 38 so as to move the traveling nut 33 inwardly which, thru movement of the links and bell cranks, causes the rim engaging jaws to move inward sufficiently to receive the rim which carries the tire to be removed. After the rim has been properly adjusted on the jaws 18, 19 and 36 so the abutments 20 engage the rim, the body 45 is slipped over one of the jaws with the rim holder 50 in position to engage the rim thru one or the other of the projections 52 or 53, after which the body member 45 is securely clamped to the jaw by movement of the eccentric 48 thru handle 47 which forces the block 49 against the jaw. The handle is then rotated to revolve the screw 38 causing the nut 33 to travel across the frame and being guided in its path tends to move the links 30 uniformly which movement causes the bell cranks 27 to draw the links 25 inward, thus collapsing the split rim.

The rim engaging portion 51 is provided with the projections 52 and 53 so as to be capable of holding rims of different widths, the projection 53 engaging smaller rims and the projection 52 engaging larger rims. To accomplish this it is only necessary to invert the body member 45 on the jaw.

What we claim is:

1. The combination with a tire changer jaw having a tire engaging abutment and a vertical standard, of a body adapted to receive loosely the standard, a bracket slidable with respect to said abutment and having a tire engaging abutment, and means on the body to lock the bracket to the standard.

2. The device of claim 1 in which the locking means includes a cam pivoted to the body to lock the bracket and body in chosen position.

3. The device of claim 1 in which the body is receivable on the standard either with the bracket abutment above or below the body so as to accommodate rims of widely varying widths.

4. The device of claim 1 in which the bracket directly engages the standard.

5. The device of claim 1 in which the locking means comprises a cam and a plate loosely carried between the cam and the body.

6. The combination with a tire changer jaw having a tire engaging abutment and a vertical standard of rectangular horizontal cross section, of a bracket adapted to slide along the front vertical face of the standard, a T-shaped horizontal extension on said bracket with the short arms of the T-head vertical and alined with the abutment, and means for securing the bracket to the jaw to form with it a double tire engaging jaw.

7. In a tire changer, a frame, a plurality of jaws all slidable on said frame, guides secured to said frame, a nut movable between said guides, means pivotally connecting all of said jaws to said movable nut, and screw means for operating said nut for simultaneously moving all of said jaws inwardly or outwardly.

8. In a tire changer, a frame, arms extending from said frame, jaws carried by said arms, bell cranks pivoted to said frame, links connecting said jaws and bell cranks, a traveling member, means for guiding said traveling member, links connecting said bell cranks to said traveling member, means for connecting a jaw to said traveling member, and rotating means for causing the traveling member to move.

9. In a tire changer, an annular base plate, a screw extending across the base plate, a bearing for the screw on said base plate, a nut on said screw, tire engaging members operatively connected with said nut, and means connecting opposite sides of the annular base plate for reinforcing the plate and for holding the nut against rotation.

10. In a tire changer, a base plate having upstanding lugs, a plurality of angularly equispaced rolled steel T-bars bolted to said lugs, a jaw slidable along each T-bar, and means to cause the jaws to move simultaneously to grip a rim.

11. In a tire changer, a base, an arm extending from said base, a jaw movable on said arm, a screw journaled on said base and on said arm, a plurality of additional jaws, and means controlled by rotation of the screw for causing the jaws to move inward toward the center of the base or in the opposite direction depending upon the direction of turning of the screw.

12. In a tire changer, a frame, rim engaging jaws movable on said frame, auxiliary rim engaging means carried by one of said jaws, said auxiliary means including a body and a bracket slidable on said body, means for locking said auxiliary means on said jaw and means for moving said jaws.

In testimony whereof we affix our signatures.

ROBERT E. MANLEY.
FREDERICK T. FLINCHBAUGH.